April 26, 1938.　　　M. ROMAINE ET AL　　　2,115,236
MACHINE TOOL
Original Filed Dec. 19, 1932
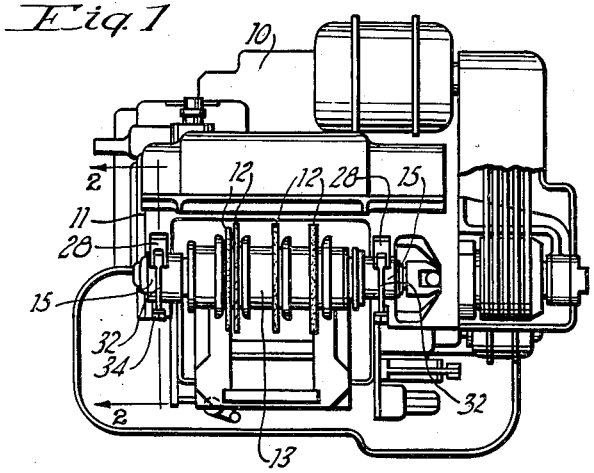
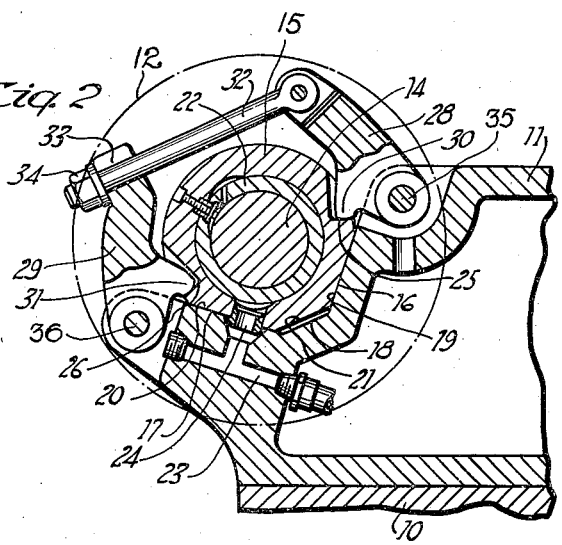
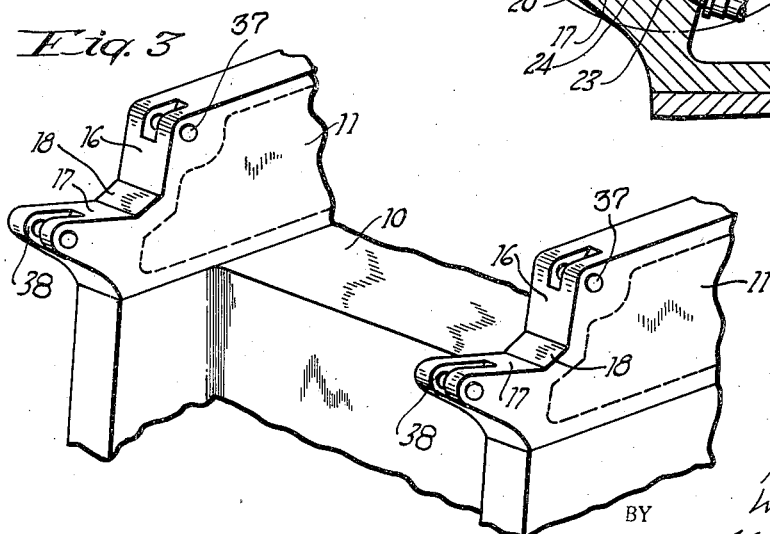
INVENTOR.
MILLARD ROMAINE
WALTER D. ARCHEA
BY
A. K. Parsons
ATTORNEY.

Patented Apr. 26, 1938

2,115,236

UNITED STATES PATENT OFFICE 2,115,236

MACHINE TOOL

Millard Romaine and Walter D. Archea, Cincinnati, Ohio, assignors to Cincinnati Grinders Incorporated, Cincinnati, Ohio, a corporation of Ohio Original application December 19, 1932, Serial No. 647,868, now Patent No. 2,065,099, dated December 22, 1936. Divided and this application October 5, 1936, Serial No. 103,994

6 Claims. (Cl. 308—24)

This invention relates to improvements in machine tools and has particular reference to an improved spindle mounting construction particularly adapted for use in connection with grinding machines or the like, being a division of our application Serial Number 647,868 which issued as Patent 2,065,099 on December 22, 1936.

One of the objects of the present invention is the provision of an improved construction which will facilitate proper alignment of grinding machine or other spindle bearings in connection with precision machine tool structures.

A further object of the present invention is the provision of an improved structure in which the spindle and bearings may readily be removed as an entirety from or inserted within a machine, thus minimizing the shutdown time when spindle or bearing replacement is necessitated.

A further object of the present invention is the provision of improved positioning and securing means for positively locking removable bearing members in precision relation to the remaining portion of a machine tool.

Other objects and advantages of the present invention should be readily apparent by reference to the following specification considered in conjunction with the accompanying drawing forming a part thereof, and it will be understood that any modifications may be made in the specific structural details hereinafter disclosed without departing from or exceeding the spirit of the invention.

Figure 1 is a plan view of a machine embodying this invention.

Figure 2 is a transverse sectional view through one of the bearings as on the line 2—2 of Figure 1, and Figure 3 is an enlarged elevation of the frame unit with bearings removed.

In the drawing in which similar characters of reference are employed to denote corresponding parts, throughout the several views the numeral 10 designates the bed of a suitable machine tool, in the present instance indicated as a centerless grinder. Mounted upon this bed is the frame or wheel head unit 11 supporting the plurality of grinding wheels 12 for operation upon a work piece. As described in our co-pending application, above referred to, these wheels are mounted on a removable cylinder 13 of such diameter as to be endwise disengageable from the supporting spindle 14 over the bearing assemblies 15. It will thus be seen that with a structure of this character it is desirable that the bearings themselves, and thus the spindle wheel and other supported parts, be quickly and readily removable or disengageable as a unit from the frame member 11, and it is equally important for precision grinding purposes that it be possible readily to reposition the complete assembly or a substitute assembly in a prescribed definite relation to the member 11.

In the accomplishment of this result the member 11 is provided at spaced points with the cooperating pairs of seating faces 16 and 17, preferably disposed at a slight obtuse angle with respect to each other and connectible as by the intermediate face 18.

By reference particularly to Figure 3, it will be noted that the pairs of seating faces 16 and the pairs of faces 17 are disposed in coplanar relationship, such that the member 11 may be suitably supported on a planer or like type of machine and the surfaces successively accurately produced in proper alignment with each other to a high degree of accuracy.

The spindle bearing structures are properly formed for accurate interengagement with the seating faces and to this end the member 15 is provided respectively with the seating faces 19 and 20, each constituting a continuous flat or plain surface, the two faces 19 and 20 being formed in the same angular relationship to each other as the faces 16 and 17 of the supporting member 11. Intermediate these faces, the member 15 has the face 21 substantially corresponding to the portion 18 of member 11 and, as indicated in Figure 2, designed in use to be slightly spaced therefrom, permitting proper wedging of the respective faces 16—19 and 17—20 into tight interfitting engagement one with the other. The member 15 just described is interiorly provided with a suitable recess containing the spindle bearing member or members 22 which may be of either cylindrical, separate shoe form or the like as may be desired.

Formed in the frame 11 is a suitable lubrication supply line 23 having interfitting engagement with a nipple 24 carried by the member 15 for supplying lubricant to the bearing members.

By reference particularly to Figure 2, it will be noted that the member 15 has formed on the outer face thereof, preferably in non-diametrical relation one to the other, the clamp-receiving seats 25 and 26 slightly inset in the member 15 as respects the faces 19 and 20 respectively and preferably disposed at an acute angle thereto.

The member 11 has pivoted thereto, by the pins 35 and 36 fitting apertures 37 and 38, the clamp arms 28 and 29 having inwardly extending lugs 30 and 31 respectively engageable with the seats 25 and 26. These arms are arcuate in form, curving outwardly around the member 15 and furcated at their outer ends. Pivoted between the furcations as of arm 28 is lock bar 32 extending transversely across the outer face of the member 15 and received in the furcation 33 of arm 29. A suitable clamping device, such as the nut member 34 engaged on the outer threaded end of rod 32 serves to apply a force drawing the outer ends of members 28 and 29 one toward the other. As this action takes place, the lugs 30 and 31 are given an inward camming action due to their relationship with their respective pivoted points where they are connected to the member 11 respectively pushing the member 15 inward and downward toward seat 17 of the member 11. This action firmly locks the member 15 in non-vibrating accurate position with respect to the member 11. At the same time the non-diametrical obtuse angled relationship of the seats 25 and 26 is such that the clamping pressure is exerted against less than the rear half of the included bearing support 15, preventing a cramping or inward springing of the member 15, tending to produce distortion and binding of the spindle bearing 22.

Particular attention is invited to the fact that by the use of the rigid non-yielding angularly related faces on the supporting member and the formation of the removable bearing support with corresponding interfitting faces, extreme accuracy of alignment of the parts at opposite sides of the machine, or in other words, near the terminal portions of the spindle, and thus avoidance of inflection of the spindle is insured. Also, the fact that by provision of the clamping seats in non-clamping seats, both to one side of the spindle bearing axis, together with cooperating clamp members each so engaging its cooperating seat as to force the included portion of the support directly against the frame in place of reaction of the clamp in a direction toward each other with a gripping of the bearing support therebetween, deflection of the bearing support and a second cramping or displacement of the contained bearing member and spindle is prevented and position alignment and free alignment without distortion of the bearing and a second free running of the thus removable supported spindle is insured.

We claim:

1. In a device of the class described the combination with a bed, of a spindle unit including a spindle and bearings carried thereby, the spindle bearings having seats formed thereon adapted to engage corresponding seats formed on the bed, said bearing seats on the spindle bearings and bed being angular in construction for thereby positioning the spindle unit in predetermined relation with respect to the bed, and clamp means carried by the bed cooperating with the spindle bearings for securing to one another the seats of said spindle bearings and bed, including a pair of clamp arms pivotally connected to the bed, clamp lugs associated with said arms in proximity to the pivotal mounting of the arms, clamping seats on the bearings, and means operable to simultaneously actuate the free ends of the clamping arms toward one another and simultaneously cause the clamping lugs to engage the seats of the bearings.

2. In a device of the class described, the combination with a bed, of a spindle unit including a spindle and supporting bearings normally secured thereto for application to and removal from the bed as a unit, said bed having bearing receiving recesses formed therein with angularly related walls providing a substantially V-shaped trough, and the spindle bearings having corresponding angularly related outer walls for interfitting engagement with the walls of the recess, clamping means carried by the bed effective to urge the angularly related faces of the bearing receiving recess and the bearing into engagement one with the other whereby the respective bearings for the spindle are definitely aligned one with respect to the other and both with respect to the bed and rotation thereof prevented, said clamping means comprising opposed pairs of clamp arms pivoted exteriorly of the recesses and having inwardly extending clamping portions for engagement with the bearing movable in an arcuate path in a direction toward the proximate angular faces of the recesses whereby proper setting of the bearing in the recess is effected.

3. In a device of the class described, the combination with a bed, of a spindle unit including a spindle and supporting bearings normally secured thereto for application to and removal from the bed as a unit, said bed having bearing receiving recesses formed therein with angularly related walls providing a substantially V-shaped trough, and the spindle bearings having corresponding angularly related outer walls for interfitting engagement with the walls of the recess, clamping means carried by the bed effective to urge the angularly related faces of the bearing receiving recess and the bearing into engagement one with the other whereby the respective bearings for the spindle are definitely aligned one with respect to the other and both with respect to the bed and rotation thereof prevented, said clamping means comprising opposed pairs of clamp arms pivoted exteriorly of the recesses and having inwardly extending clamping portions for engagement with the bearing movable in an arcuate path in a direction toward the adjacent angular faces of the recesses whereby proper setting of the bearing in the recess is effected, and adjustable means spanning the removable bearing and connecting the outer portions of said pivoted clamps for jointly effecting the clamping action thereof.

4. In a device of the character described, the combination with a supporting unit and a spindle adapted to be rotatably mounted thereon, said supporting unit having a spindle bearing receiving recess formed therein, of a bearing circumscribing the spindle and having portions interfitting with the recess in the support, said bearing having seats formed thereon disposed in planes forming an obtuse angle with the spindle at the support side thereof, and clamping means engaging the seats and forcing the included portion of the bearing against the support, whereby distortion of the bearing in a direction to cause binding thereof against the spindle is prevented.

5. A device of the character described, the combination with a support and a rotatable spindle adapted to be mounted thereon, of means for detachably securing the spindle to the support, including a spindle journal member circumscribing the spindle and formed at one side thereof with angularly related journal supporting faces, the support having formed therein a journal receiving seat with faces complementary to those on the journal for interfitting engagement therewith, said journal having clamp receiving seats formed thereon adjacent the angular support engaging faces, said seats being disposed within an including angle of less than 180°, and clamp members carried by the support and interengaged with said seats for forcing the seat engaging faces of the journal against the complementary faces of the support without circumferential compression of the journal against the spindle.

6. A machine tool structure of the character described including a support unit having a plurality of coplanar lower seats formed therein and a second plurality of coplanar angularly disposed upwardly extending seating faces located in cooperative relation to said lower seats and a spindle assembly for application to said support member having a plurality of bearing supports, each formed with angularly related seating faces for interfitting engagement with the respective coplanar faces of the support, said bearing supports having clamp-receiving seats, adjacent the respective faces, and means engaging said seats for clamping the bearing supports to the main support whereby compression of the bearing supports against the spindle is prevented.

MILLARD ROMAINE.
WALTER D. ARCHEA.